United States Patent
Nickel

(10) Patent No.: US 10,212,002 B2
(45) Date of Patent: Feb. 19, 2019

(54) SUBSCRIBER STATION FOR A BUS SYSTEM, AND METHOD FOR WIDEBAND CAN COMMUNICATION

(71) Applicant: Robert Bosch GmbH, Stuttgart (DE)

(72) Inventor: Patrick Nickel, Birstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 87 days.

(21) Appl. No.: 15/024,502

(22) PCT Filed: Oct. 9, 2014

(86) PCT No.: PCT/EP2014/071696
§ 371 (c)(1),
(2) Date: Jul. 7, 2016

(87) PCT Pub. No.: WO2015/052296
PCT Pub. Date: Apr. 16, 2015

(65) Prior Publication Data
US 2016/0308687 A1 Oct. 20, 2016

(30) Foreign Application Priority Data
Oct. 9, 2013 (DE) .................... 10 2013 220 374

(51) Int. Cl.
*H04L 12/40* (2006.01)
*H04L 25/03* (2006.01)
(Continued)

(52) U.S. Cl.
CPC .... *H04L 12/4013* (2013.01); *H04L 12/40169* (2013.01); *H04L 25/0384* (2013.01);
(Continued)

(58) Field of Classification Search
CPC .......... H04L 12/4013; H04L 12/40169; H04L 25/0384; H04L 2012/40215;
(Continued)

(56) References Cited

U.S. PATENT DOCUMENTS 5,552,921 A * 9/1996 Hetzel ................ B60R 16/0315
370/389
6,577,598 B1 * 6/2003 Hwang ............... H04L 27/2608
370/235
(Continued)

FOREIGN PATENT DOCUMENTS

CN 101083482 12/2007
CN 102821080 A 12/2012
(Continued)

*Primary Examiner* — Warner Wong
(74) *Attorney, Agent, or Firm* — Norton Rose Fulbright US LLP; Gerard Messina

(57) ABSTRACT

A user station for a bus system and a method for broadband CAN communication are provided, in which the user station includes a pulse shaping device for shaping the pulse of a message so that the message includes a training sequence which includes pieces of information for determining the channel characteristic between the user station and a further user station of the bus system to which the message is to be transmitted, and/or a correction device for correcting a signal received by the user station based on a training sequence, which is included in a message shaped by a pulse shaping device of the further user station.

9 Claims, 3 Drawing Sheets

(51) Int. Cl.
  *H04L 12/18* (2006.01)
  *H04L 12/931* (2013.01)
(52) U.S. Cl.
  CPC ........ *H04L 12/1868* (2013.01); *H04L 49/505* (2013.01); *H04L 2012/40215* (2013.01)
(58) Field of Classification Search
  CPC ........... H04L 29/12849; H04L 61/6027; H04L 25/00; H04L 7/00; H04L 7/0016; H04L 7/0033; H04L 2027/0026; H04L 49/55; H04L 49/505; H03M 13/00
  See application file for complete search history.

(56) References Cited

U.S. PATENT DOCUMENTS

| | | | |
|---|---|---|---|
| 6,625,777 B1* | 9/2003 | Levin | H04L 1/0009 714/751 |
| 2002/0150118 A1* | 10/2002 | Zinke | H04L 25/4902 370/442 |
| 2004/0001552 A1* | 1/2004 | Koifman | H04L 27/2608 375/260 |
| 2004/0085917 A1* | 5/2004 | Fitton | H04L 1/0061 370/292 |
| 2005/0175080 A1* | 8/2005 | Bouillett | H04L 25/03019 375/229 |
| 2006/0037008 A1* | 2/2006 | Stelzer | G06F 17/5054 717/136 |
| 2007/0041469 A1 | 2/2007 | Dally | |
| 2008/0253777 A1* | 10/2008 | Delve | H04L 25/03019 398/208 |
| 2008/0298384 A1* | 12/2008 | Beaucage | B61L 15/0036 370/445 |
| 2012/0269253 A1* | 10/2012 | Daecke | H04B 3/14 375/232 |
| 2013/0282946 A1* | 10/2013 | Ricci | G06F 13/4004 710/306 |
| 2014/0119381 A1* | 5/2014 | Diab | H04L 12/40 370/431 |
| 2014/0223265 A1* | 8/2014 | Lusted | H04L 1/004 714/776 |
| 2016/0241422 A1* | 8/2016 | Akita | H04B 3/10 |

FOREIGN PATENT DOCUMENTS

| | | |
|---|---|---|
| DE | 10 2011 007 846 A1 | 10/2012 |
| JP | 2000188565 A | 7/2000 |
| WO | 99/46886 A2 | 9/1999 |

* cited by examiner

SUBSCRIBER STATION FOR A BUS SYSTEM, AND METHOD FOR WIDEBAND CAN COMMUNICATION

FIELD OF THE INVENTION

The present invention relates to a user station for a bus system and to a method for broadband CAN communication, in which communication in a CAN bus system is possible for higher speeds beyond CAN-FD.

BACKGROUND INFORMATION

Automobile bus systems are continuously developing toward higher bandwidths, lower latency periods, and stricter real-time capability. The CAN bus system has become widely accepted for the communication between sensors and control units. In the CAN bus system, messages are transmitted with the aid of the CAN protocol as it is described in the CAN specification in ISO 11898. Most recently, techniques have also been proposed in this regard, such as CAN-FD, in which messages are transmitted, and the like, in accordance with the specification "CAN with Flexible Data-Rate, Specification Version 1.0" (source http://www.semiconductors.bosch.de). Such techniques increase the maximally possible data rate through the use of higher clocking in the area of the data fields above a value of 1 Mbit/s.

In addition to primarily functional supplements, such as time-triggered CAN (TTCAN), the extension of the CAN standard most recently was extended with CAN-FD in particular with respect to the possible (higher) data rate and the usable data packet size, the quintessential CAN properties having been maintained, in particular in the form of the arbitration. Moreover, the signal representation in the data portion was essentially changed by a higher switching frequency of the signal states (high/low).

German patent document DE 10 2009 026 961 A1 discusses a method for transmitting data between user stations of a bus system, in which an extension of the existing CAN signal and of the associated communication device with respect to the use of high-frequency signals is disclosed, which are impressed onto the line in any arbitrary form (simultaneously or embedded) in relation to a CAN data stream. In particular, a coordination of the signal (synchronization signal, trigger) with the CAN signal is proposed.

At present, deliberations are being made to also enable higher speeds beyond CAN-FD, in particular in a range from 5 to 100 Mbit/s, for automobile bus systems. It should, however, also be possible to operate the user stations configured for higher speeds in mixed networks with existing CAN user stations or CAN nodes. It is problematic in this regard if this should necessitate an adaptation of the application software to the network having higher speeds in the CAN user stations of the bus system, since an adaptation of the application software is usually complex and therefore cost-intensive.

SUMMARY OF THE INVENTION

It is thus an object of the present invention to provide a user station for a bus system and a method, which solve the above-mentioned problems. In particular, a user station for a bus system and a method should be provided which enable a refinement of the CAN signal structures and necessary communication devices toward higher data rates even without a software adaptation, in particular for the use or application.

The object is achieved by a user station for a bus system having the features described herein. The user station includes a pulse shaping device for shaping the pulse of a message in such a way that the message includes a training sequence which includes pieces of information for determining the channel characteristic between the user station and a further user station of the bus system to which the message is to be transmitted, and/or a correction device for correcting a signal received by the user station based on a training sequence which is included in a message shaped by a pulse shaping device of the further user station.

Due to the user station, a use of novel communication formats in the middle segment of the CAN frame becomes possible. During communication, in particular no additional system is operated in parallel for this purpose, but the actual CAN structure is refined in multiple approaches and implementation suggestions for high data rates.

Moreover, as a result of the user station, the CAN bus system is refined for higher speeds beyond CAN-FD in such a way that essential application features are consistent with existing CAN principles. In this way, a mixed operation is possible, in which user stations configured for the higher speeds are operated in mixed networks with existing CAN user stations or CAN nodes.

The above-described user station is also suited, as needed, for use in systems which are able to process data rates beyond CAN-FD.

Advantageous further embodiments of the user station are stated in the further descriptions herein.

It is possible for the pulse shaping device to be configured so that it situates the training sequence after a frame header and before a frame end of the message, the frame header and the frame end being formed according to the CAN protocol.

The pulse shaping device may be configured so that it situates the training sequence at the start or in the middle of a data segment which is situated between the frame header and the frame end of the message, and/or the pulse shaping device is configured so that it forms the data in the data segment using a bit rate in the range of 5 to 100 Mbit/s. The pulse shaping device may furthermore be configured so that the data segment additionally includes parameters, information bits and a checksum, in this order, the information bits including pieces of information which are to be transmitted from the user station as the transmitter to the further user station as the receiver.

It is also possible for the correction device to additionally be configured to correct the signal received by the user station according to a DFE algorithm or a BCJR algorithm or a DDFSE algorithm for signal equalization.

The correction device possibly includes an analog-to-digital converter, which is combined with a conventional CAN transceiver, and the pulse shaping device includes a digital-to-analog converter having a downstream switch for coupling recessive states onto the bus line. In addition or as an alternative, the pulse shaping device may include a pull-down transistor or a transceiver for coupling dominant states onto the bus line.

The user station may additionally include a transceiver for the direct connection to a bus line of the bus system, and a communication control device for processing the signals received by the transceiver and for providing the messages to be transmitted by it in the form of signals, the pulse shaping device and/or the correction device being part of the transceiver or of the communication control device.

The above-described user station may form part of a bus system which additionally includes a bus line and at least two user stations, which are connected to each other via the bus line in such a way that they are able to communicate with each other. At least one of the at least two user stations is an above-described user station.

The above-mentioned object is furthermore achieved by a method for broadband CAN communication as recited in Patent Claim 10. The method includes the following steps: shaping the pulse, with the aid of a pulse shaping device, of a message in such a way that the message includes a training sequence which includes pieces of information for determining the channel characteristic between the user station and a further user station of the bus system to which the message is to be transmitted, and/or correcting, with the aid of a correction device, a signal received by the user station based on a training sequence which is included in a message shaped by a pulse shaping device of the further user station.

The method offers the same advantages as those mentioned above with respect to the user station.

Further possible implementations of the present invention also include not explicitly described combinations of features or specific embodiments which are described at the outset or hereafter with respect to the exemplary embodiments. Those skilled in the art will also add individual aspects as improvements or supplements to the particular basic form of the present invention.

The present invention is described in greater detail hereafter with reference to the accompanying drawing and based on exemplary embodiments.

In the figures, identical or functionally equivalent elements are denoted by the same reference numerals, unless indicated otherwise.

DETAILED DESCRIPTION

Figure 1:
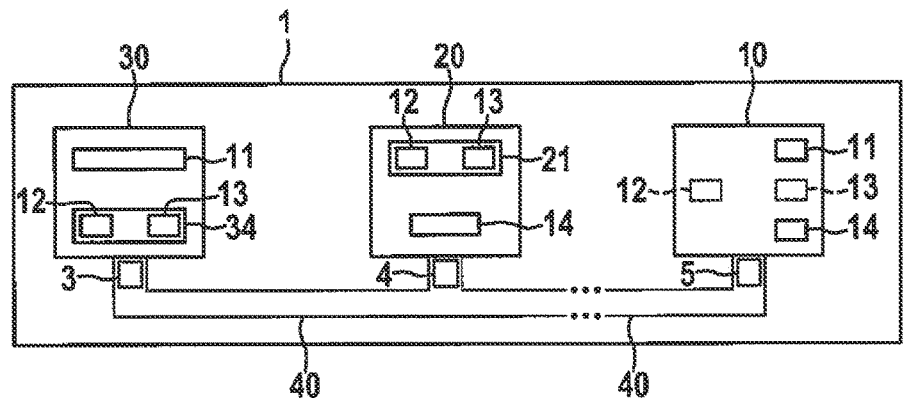
FIG. 1 shows a simplified block diagram of a bus system according to a first exemplary embodiment.

FIG. 1 shows a bus system 1, which may be a CAN bus system, a CAN-FD bus system and the like, for example. Bus system 1 may be used in a vehicle, in particular a motor vehicle, an airplane and the like, or in a hospital and the like.

In FIG. 1, bus system 1 has a plurality of user stations 10, 20, 30, which are each connected to a bus line 40. Messages 3, 4, 5 in the form of signals are transmittable between individual user stations 10, 20, 30 via bus line 40. User stations 10, 20, 30 may be control units or display devices of a motor vehicle, for example.

As shown in FIG. 1, user station 10 includes a communication control device 11, optionally a pulse shaping device 12, optionally a correction device 13, and a transceiver 14.

In contrast, user station 20 has a communication control device 21, which includes a pulse shaping device 12 and a correction device 13, and a transceiver 14. User station 30, like user station 10, has a communication control device 11 and a transceiver 34, which includes a pulse shaping device 12 and a correction device 13. Transceivers 14, 34 of user stations 10, 20, 30 are directly connected in each case to bus line 40, even though this is not shown in FIG. 1.

As shown in FIG. 1, each of user stations 20, 30 includes a pulse shaping device 12 and a correction device 13. Pulse shaping device 12 and correction device 13 do not necessarily have to be present in user station 10. However, in user station 20, pulse shaping device 12 and correction device 13 are part of communication control device 21. In user station 30, pulse shaping device 12 and correction device 13 are part of transceiver 34. Communication control device 21 of user station 20 is otherwise identical to communication control device 11 of user station 10. Moreover, transceiver 34 of user station 30 is otherwise identical to transceiver 14 of user station 10.

Communication control device 11 is used to control a communication of the particular user station 10, 20, 30 via bus line 40 with another user station of user stations 10, 20, 30 connected to bus line 40. Pulse shaping device 12 and correction device 13 are used to transmit messages 3, 4, 5 at a high data rate on bus line 40 having a CAN bus topology, as is described in greater detail hereafter. Communication control device 11 may be configured as a conventional CAN controller. Transceiver 14 may be configured as a conventional CAN transceiver with respect to its transmission functionality. Accordingly, the two user stations 20, 30 may be used to form and then transmit messages 3, 4 at higher data rates than CAN-FD. User station 10, in contrast, corresponds to a conventional CAN user station, both with respect to its transmission functionality and its reception functionality, and transmits messages 5 according to the CAN protocol if it does not include pulse shaping device 12 and correction device 13.

Figure 2:
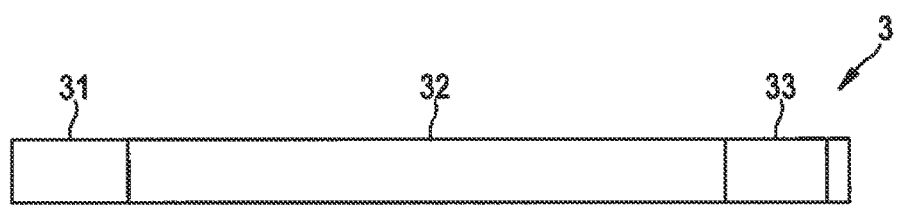
FIG. 2, FIG. 3 and FIG. 4 show a schematic representation of the composition of a message which is transmitted in the bus system according to the first exemplary embodiment.

FIG. 2 shows a highly schematic representation of the composition of a message 3, which is composed identically to a message 4. Accordingly, message 3, which is also referred to as a frame, has a frame header 31, a data segment 32, and a frame end 33. Frame header 31 is situated at the start of message 3, data segment 32 is situated in the middle, and frame end 33 at the end of message 3. Except for marking bits which are adapted in particular in terms of their value, frame header 31 corresponds to the CAN header of a CAN frame, i.e., a message 5. Except for marking bits which are adapted in particular in terms of their value, frame end 33 corresponds to the CAN end of a CAN frame, i.e., a message 5.

Pulse shaping device 12 not only increases the signal speed for middle data segment 32, but the entire signal structure is redefined to obtain a high robustness at even higher data rates. No additional protocol or additional data channel is required for this purpose, but pulse shaping device 12 merely adapts the signal format when creating a message 3, 4. The form of the signal format is configured so that it allows secure communication even with typical signal interferences, e.g., due to radiation and the like, and hardware tolerances impacting synchronization requirements, and at the same time adheres to the spectral masks with respect to radiation or electromagnetic compatibility (EMC).

Figure 3:
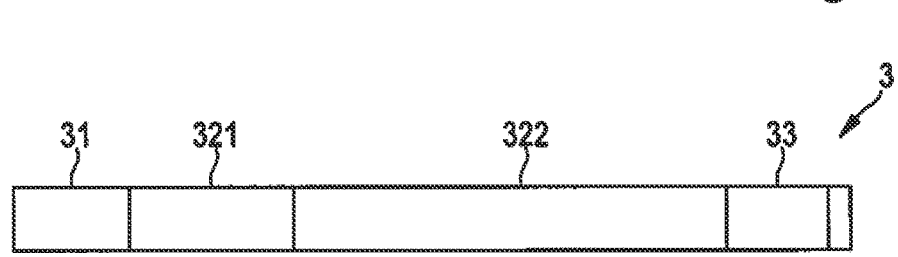

FIG. 3 shows that data segment 32 includes a training sequence 321 and data 322. In the variant shown in FIG. 3, training sequence 321 is situated before data 322, i.e., at the start of data segment 32. Alternatively, however, training sequence 321 may be situated in the middle of data segment 32. Training sequence 321 allows all user stations 10, 20, 30 to ascertain the particular channel characteristic of bus line 40 based on the instantaneously received data frame. The particular channel characteristic results from the fact that for CAN bus topologies different propagation paths exist for the signals on bus line 40. Depending on the considered user station 10, 20, 30 as the transmitter and receivers communicating with it, these connections have different impulse responses, which contribute to signal distortion.

In the existing CAN system, this problem was solved by what may be a linear line structure having a defined termination. The relatively low data rate with CAN furthermore allows the use of defined bus levels which after a defined time, which is shorter than the bit or symbol duration, are in a steady state at all reception points. At a higher bit rate or symbol rate, the propagation effects on bus line 40 result in considerable crosstalk between two consecutive transmission symbols, so that a signal equalization is carried out for high-rate transmission with the aid of correction device 13. Due to the broadcast characteristic of the parallel bus, the establishment of a link between two user stations 10, 20, 30, as it is used, for example, with a product from Broadcom denoted by the registered trademark BroadR-Reach®, with possibly adapted pre-equalization, is not implementable for the connection between two user stations 10, 20, 30.

Figure 4:
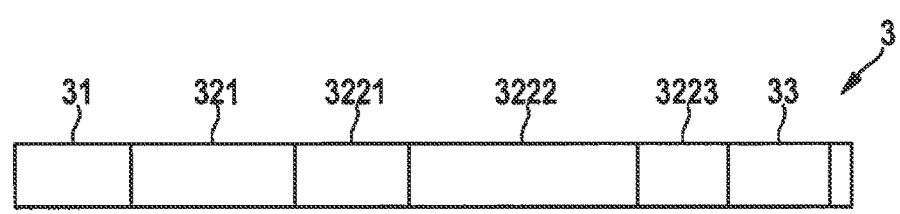

According to FIG. 4, data segment 32 in data 322 additionally includes parameters 3221, information bits 3222 and checksum CRC. Using parameters 3221 as, e.g., additional parameters and checksum CRC, which is increased, if necessary, it is possible to additionally protect the integrity of a message 3 as a data packet. Information bits 3222 include the pieces of information which are to be transmitted as information from one of user stations 10, 20, 30 as the transmitter to the corresponding receiver in bus system 1.

In the present exemplary embodiment, a linear modulation based on pulse amplitude modulation (PAM) is used in middle data segment 32. Alternatively, it is also possible to use multicarrier methods, e.g., an orthogonal frequency multiplexing method (OFDM=orthogonal frequency division multiplexing) and the like; however, these methods have unfavorable properties with respect to an efficient and cost-effective implementation.

During mapping, the pulse amplitude modulation in the present exemplary embodiment maps the, optionally encoded and interleaved, bits on modulation symbols. In the case of $2^n$ PAM, n-tuples of transmission bits are mapped on signal levels. For example, the following applies to a realistic 4-pulse amplitude modulation: +1 V (00), +0.33 V (01), −0.33 V (11), −1V (10).

The transmission pulse shape of a message 3, 4 is configured by pulse shaping device 12 corresponding to the spectral requirements (masks). A Nyquist pulse as a transmission pulse is considered as an example, a root-raised-cosine filter being particularly suited as a transmission filter for pulse shaping. In this case, a raised cosine overall pulse is obtained at the receiver of message 3, 4 with the corresponding reception filter. The transmission filter may be digitally represented using two-fold oversampling. An additional analog filter is used for bandwidth limitation (anti-aliasing), which may have a considerably simpler design with digital prefiltration.

EXAMPLE

A sampling rate of 40 MHz (two-fold oversampling) and a roll-off factor of 0.5 yield a bandwidth of 15 MHz at a symbol rate of 20 MHz. For a 4-pulse amplitude modulation (4-PAM), a raw bit rate of 40 Mbit/s is achieved.

On the other side of the transmission path, correction device 13 is provided for receiving message 3, 5. In the case of reception of a message 3, 5, correction device 13 carries out the following steps:

level adaptation with the aid of automatic gain control (AGC)

synchronization (timing, sampling clock pulse, beginning mark)

channel estimation filter calculation (forward and backward filters for decision feedback equalization (DFE)), if necessary adaptation equalization The intersymbol interference (ISI) induced by the distorting transmission channel in the reception signal is overcome by using equalization in the receiver. The necessary channel state information, e.g., in the form of the impulse response for the channel estimation, is obtained based on training sequence 321. In the case of strong clock deviations between one of user stations 20, 30 as the transmitter and another of user stations 20, 30 as the receiver, an adaptive adjustment of the channel estimation and of the resultant filter coefficients must be carried out, in addition to the adjustment of the clock synchronization. In the case of an optionally used transformer (galvanic isolation), a suppressed constant component results, which may be adjusted separately in the detector.

Figure 5:
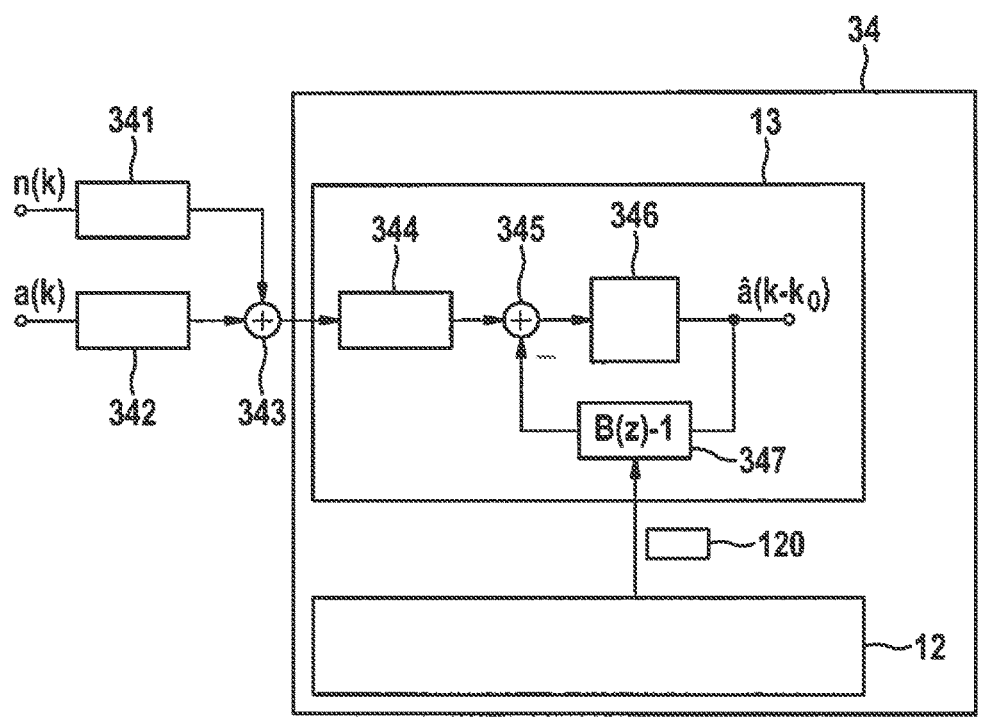
FIG. 5 shows a block diagram to explain the function of a pulse shaping device and a correction device of the bus system according to the first exemplary embodiment.

FIG. 5 shows the composition of pulse shaping device 12 and of correction device 13 of transceiver 34. Correction device 13 is used instead of a comparator of a conventional CAN transceiver. Correction device 13, for example, forms a decision-feedback equalization structure, which hereinafter is also referred to as a DFE structure, as shown in FIG. 5. Channel impulse response 120, which is required for the correction and may be represented by a signal b(k), is included in training sequence 321 (FIG. 3).

FIG. 5 shows the schematic design of a DFE structure having an upstream channel model. The interference on the channel or on bus line 40 is represented by a signal n(k) and a filter 341 having transmission function G(z), which corresponds to the z-transform of the discrete-time sequence g(k). The reception signal at user stations 10, 20, 30 results from a transmission signal a(k) after passing through a channel which is modeled by a filter 342 having transmission function H(z). At point 343, the resulting signals are added and then supplied to a filter 344. Filter 344 thus receives at its input the signal received by user station 30. Filter 344 is a possible additional filter in transceiver 34 having a transmission function F(z). Filter 344 may be used to concentrate the signal energy, however a constant transmission function may be assumed, such as F(z)=1, for example, for a simplified consideration. Thereafter, the modeled interference is subtracted at point 345 from the signal output by filter 344. As the resulting total channel, normalized channel impulse response 120 is composed of the channel modulated with filter 342 and the output of filter 344. The run time-compensated total channel is represented by B(z), the z-transform of b(k), in FIG. 5. The value at the point k=0 represents the main tap considered for the decision, and the following values at the points k>0 correspond to the taps of preceding symbols or bits. b(k)=0 applies to coefficients b(k) of channel impulse response 120, so that the main tap of filter 347 is eliminated, which is represented by the term −1 of filter 347 given by B(z)−1. The main tap has the value 1, for example. Signal $a(k-k_0)$ resulting from the compensation by the correction signal after addition stage 345 is then supplied to a decider 346, which corresponds to the comparator of a conventional CAN transceiver. Thereafter, the reception signal corrected by correction device 13 is available for communication control device 11 or 21 for further processing. In FIG. 5, the term $k_0$ represents a decision delay, having a delay $k_0$ of the filter signal downstream from filter 344 which may be optimized by filter 344 having transmission function F(z) and here is assumed to be $k_0=0$ for a simplified consideration.

The following applies, for example:
example channel impulse response h(k)=δ(k)+0.5 δ(k−1)+0.2 δ (k−2)
prefilter impulse response f(k)=δ(k)=>F(z)=constant
decision delay $k_0=0$ For this case, b(k)=h(k) is a useful approach, and B(z)−1 corresponds to channel impulse response b(k)−δ(k)=h(k)−δ(k)=0.5 δ(k−1)+0.2 δ(k−2). It is easily apparent here that only symbols which have already been decided and are known are used for feedback since the instantaneous decision point in time corresponds to k, and this impulse response only takes terms into consideration which are based on reception values (k−1, k−2) lying in the past.

According to the preceding description of FIG. 5, pulse shaping device 12 configures filter 347 via channel impulse response 120. It is possible, and still more advantageous for increasing the quality of the correction by correction device 13, to also configure filter 344 using an appropriate channel impulse response, which differs from channel impulse response 120, if necessary. The configuration of filter 344 using the appropriate channel impulse response is carried out in the same form as the above-described configuration of filter 347.

While pulse shaping device 12 and correction device 13 are very simple to implement in transceiver 34, their implementation in communication control device 11 is also possible, as is shown by communication control device 21 of user station 20.

The method according to the present exemplary embodiment observes the CAN bus signal during the transmission and corrects the signal with the aid of the above-described DFE structure.

Having knowledge of the channel impulse response is advantageous for this purpose, the channel impulse response being dependent on the pairing of the transmitter and receiver, as described above. The impulse response is estimated based on training sequence 321 in the receiver of a message 3, 4. In principle there is no delay of the signal of message 3, 4, but further optimization measures may be utilized, in particular a filter optimization.

In this way, a novel concept for the physical layer is considered and a user station and a method for implementation are represented to refine the CAN bus system to higher speeds beyond CAN-FD, in particular for the data rate range between 5 and 100 Mbit/s. To achieve a compatibility with existing CAN user stations 10, after an extended specification for coexistence, and a migration path of the CAN system, the structures of the CAN bus signal are thus maintained, in particular in the header and at the end of a CAN frame, such as of message 5, and supplemented with a more complex transmission form in the middle segment of the CAN frame to obtain a high net data rate. In particular, the (optional) use of a higher number of payload data in data segment 32 makes a very high maximum data rate possible. The described use of high order modulation in the data segment of CAN represents a possible technique. This modulation may be established based on known methods, e.g., pulse amplitude modulation (PAM) and multicarrier modulation (orthogonal frequency division multiplexing (OFDM))—also in combination with different methods— and also utilize higher frequency ranges, in addition to a base band. By appropriately designing the front end, i.e., frame header 31, the arbitration is carried out in the existing form known from CAN, a planning of CAN IDs taking place in the existing form. For the high-rate part in the middle segment of a frame, data segment 32, messages 3, 4 are coupled onto bus system 1 in the form of signals having a constant impedance of the transmission output stage. Due to the possible reflections on bus line 40, methods for signal equalization are provided in the receiver, which are carried out by correction device 13, and taken into consideration in the design of the frame format.

Figure 6:
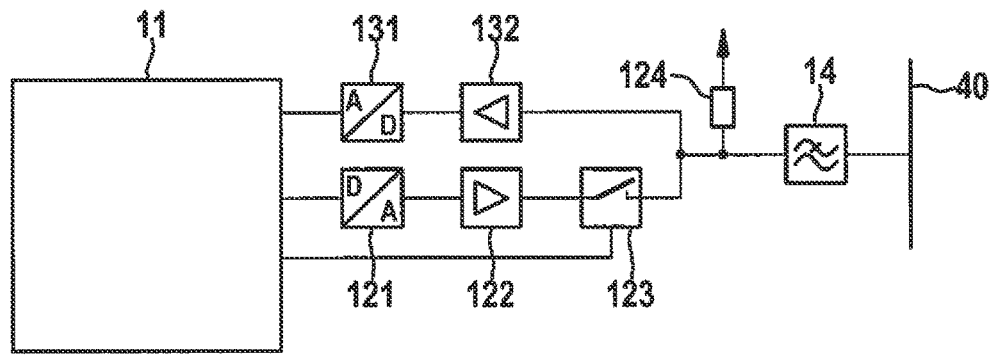
FIG. 6 shows a block diagram to explain the function of a pulse shaping device and a correction device of the bus system according to a second exemplary embodiment.

FIG. 6 shows a second exemplary embodiment for a hardware design of pulse shaping device 12 and correction device 13. According to this figure, combinations of an existing CAN transceiver 14, which is connected to bus line 40, and additional analog-to-digital and digital-to-analog transceivers 131, 121 are possible for a hardware design of pulse shaping device 12 and of correction device 13. FIG. 6 shows a non-symmetrical representation as an example of the internal resistance circuit using a pull-up resistor 124.

According to FIG. 6, the reception part, i.e., correction device 13, is implemented via A/D converter 131 including corresponding post-processing 132. The transmission part, i.e., pulse shaping device 12 (FIG. 1), is implemented via D/A converter 121 including a downstream amplifier 122, D/A converter 121 being connectable via a switch 123 to a high impedance level or disconnectable therefrom. In this way, it is possible to couple in recessive states via resistor 124.

Figure 7:
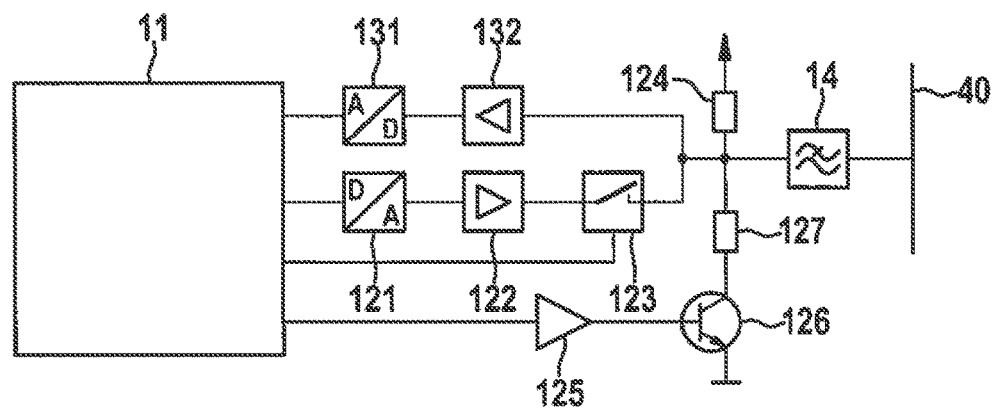
FIG. 7 shows a block diagram to explain the function of a pulse shaping device and a correction device of the bus system according to a third exemplary embodiment.

FIG. 7 shows a third exemplary embodiment for a hardware design of pulse shaping device 12 (FIG. 1) and of correction device 13 (FIG. 1). In addition to the elements shown in FIG. 6, a pull-down transistor or a conventional transceiver is used in pulse shaping device 12 for representing dominant states in messages 3, 4. Accordingly, the lower circuit part in FIG. 7 is shown with a buffer 125, a pull-down transistor 126 and a resistor 127, which are used to represent dominant states in messages 3, 4.

According to a fourth exemplary embodiment, pulse shaping device 12 only includes the lower circuit part of FIG. 7 for representing dominant states in messages 3, 4, instead of elements 121, 122, 123, 124. According to this exemplary embodiment, thus no incoupling of recessive states onto bus line 40 takes place.

All above-described embodiments of bus system 1, user stations 10, 20, 30 and of the method may be used individually or in any possible combinations. In addition, in particular the following modifications are conceivable.

The above-described bus system 1 according to the exemplary embodiments is described based on a bus system which is based on the CAN protocol. Bus system 1 according to the exemplary embodiments, however, may also be a different type of communication network. It is advantageous, but not a necessary prerequisite, to ensure an exclusive, collision-free access of a user station 10, 20, 30, 50, 60 to a shared channel in bus system 1, 2, at least for certain time periods.

Bus system 1, 2 according to the exemplary embodiments is in particular a CAN network or a TTCAN network or a CAN-FD network. The number and arrangement of user stations 10, 20, 30 in bus system 1 of the exemplary embodiments are arbitrary. In particular, it is possible for only user stations 10 or user stations 20 or user stations 30 to be present in bus system 1 of the exemplary embodiments. User stations 10, 20, 30 also do not have to include both a pulse shaping device 12 and a correction device 13. User stations 10, 20, 30 may also include only one pulse shaping device 12 or one correction device 13.

Instead of the decision-feedback equalization structure (DFE structure) described in the first exemplary embodiment for pulse shaping device 12 and correction device 13, it is also possible to employ arbitrary trellis-based equalization methods, such as the BCJR algorithm (the individual letters in BCJR denote the initials of the developers: B for L. Bahl, C for J. Cocke, J for F. Jelinek, R for J. Raviv,) and/or a DDFSE algorithm (DDFSE=delayed decision-feedback sequence estimation).

Various fields of application of user station 10, 20, 30 and of the method carried out by the same are conceivable. In addition to the use for CAN and CAN-FD, in particular also an application in FlexRay is conceivable. These systems do not as yet use any equalization methods in the receiver of the receiving user station.

The method may be separately optimized for any special application, such as CAN-FD, FlexRay, and the like. The application may also be automatically identified and accordingly adapted for multiple fields of application. For example, the method must be carried out faster with CAN-FD than with CAN, so that no delay is created which is longer than the one tolerated by the particular protocol.

Multiple transmission formats are available for the transmission on the channel of bus line 40. In general, the transmission may take place in the base band, so that the sampled values may be coupled directly by digital-to-analog converter 121 via amplifier 122 onto bus line 40.

In addition to the digital pulse shaping in the transmitter or in pulse shaping device 12 and signal filtering in the receiver or correction device 13, it is also possible to use analog filter stages.

As an alternative to base band transmission, a carrier-based transmission may be used, in which the QAM modulation symbols are modulated onto a carrier frequency. A modulation of the carrier frequency is also possible in the digital range when using oversampling. The transmission in the base band is an implementation that may be used since the transmission channel has the best properties in the lower frequency range, for example the greatest capacity. For a modulation in the base band, modulation symbols having realistic values (e.g., 2-, 4-, 8-, 16-PAM) are used.

Instead of a coherent transmission, which requires a frequency and phase synchronization and a channel estimation, it is possible to use an incoherent transmission in the case of a channel having little distortion, resulting from the conduction properties; however, this has a considerably poorer efficiency.

In addition to the above-mentioned pulse amplitude modulation (PAM), orthogonal frequency division modulation (OFDM) may be used as a possible design. For this purpose, the data to be transmitted are mapped on symbols of multiple carriers and assigned to the individual frequencies of an OFMS. In order to generate the transmission signal, the symbols of an OFDM symbol are transformed into the time range with the aid of inverse Fourier transform (IFFT), and the resulting sequence is provided with a cyclic extension. An additional observation interval (guard interval) should be configured in terms of the length in such a way that the resulting sequence includes the length of the intersymbol interference (ISI) of the transmission channel. Typically, the length is a time duration of 0.2 μs to 0.8 μs. For the OFDM, a training sequence 321 is used for channel estimation. Furthermore, not all sub-carriers are occupied in the OFDM signal, so that the band limits are skipped to avoid overlapping. In addition, individual sub-carriers in the OFDM signal are provided with training symbols to enable the synchronization.

A portion of training sequence 321 is used as the basis for the level adjustment and synchronization of messages 3, 4.

For the channel estimation, a training sequence 321 having a certain length, such as 63 symbols, may be used. For this purpose, a training sequence 321 may be selected from the gold codes, which have particularly good autocorrelation properties.

A basis for the method is the determination of channel impulse response 120, which is used for equalization. This may be obtained by estimating channel impulse response 120 of the transmission channel of bus line 40 based on training sequence 321. Alternatively, channel impulse response 120 may also be directly determined or optimized in the form of signal b(k). The estimation of channel impulse responses 120 may be carried out using all suitable methods. It is also possible to use adaptive methods for supplementing the channel estimation carried out based on training sequence 321, such as a least mean squares (LMS) algorithm and/or recursive least squares filter (RLS) algorithm.

In order to stabilize the estimation and increase the accuracy of channel impulse response 120, the parameters and coefficients of previously received messages 3, 4, 5 or packets of messages 3, 4, 5, which may also be referred to as reception bursts, may be assigned to the message identifiers or the transmitting user stations, and be used for chronologically received messages 3, 4, 5 or packets of messages 3, 4, 5.

In user stations 10, 20, 30 in their function as the receiver, the clock may be either adjusted by clock synchronization or corrected by oversampling and interpolation. If the timing drift does not require compensation, the channel estimation, including the filters derived therefrom, must be adjusted.

Since the properties of the channel may be very unfavorable due to strong distortion, the use of DFE including corresponding prefiltering may be used. As an alternative, linear methods, such as minimum mean square error (MMSE) filters or zero-forcing (ZF) filters may be used for equalization.

Instead of the DFE, it is also possible to utilize other, more complex equalization methods (with decision delay); these include in particular the BCJR algorithm and the delayed decision-feedback sequence estimation (DDFSE).

In addition or as an alternative to the estimation of the channel or of its channel impulse response 120, filters 341, 342, 344 in transceiver 14, 34 may be optimized. For this purpose, filters 344 (transmission function F(z)) and 347 (transmission function B(z)−1) and decision delay $k_0$ are considered. Different criteria may be used for the optimization, such as a maximization of the signal-to-interference ratio at the input of decider 346.

Alternatively, required filter coefficients 344, 347 are provided by the estimation device without explicit estimation of channel impulse response 120, but are determined directly from the signal received by user stations 10, 20, 30.

The use of two-fold oversampling using DFE filters inherently results in a resampling corresponding to the sampling raster by the DFE forward filter, which combines the filtered polyphase components. Since the clock may shift by a certain phase from the start of data segment 32 to the end of data segment 32, an adjustment may be used when clock synchronization is absent.

The high-rate transmission mode may be implemented as an additional operating variant in such a form that the corresponding communication device is able to handle all existing CAN modes, such as, among other things, CAN-FD, partial networking, and the like.

Moreover, the high-rate transmission mode may be implemented in such a way that this mode may be operated in coexistence with existing CAN modes, such as, among other things, CAN-FD, partial networking, and the like.

The partitioning of the above-described functionality of pulse shaping device 12 and of correction device 13 in one communication device may also be implemented in such a way that the above-described functionality is distributed among multiple components. In this way, a similar implementation corresponding to existing CAN controllers and CAN transceivers may be used. Both analog and digital interfaces may be used for connecting multiple components.

User stations 20, 30 represent an option, in particular for CAN-FD and systems having higher data rates, for increasing the reception quality of CAN-FD and of these systems into the range of customary CAN transmissions using a considerably higher data rate.

With respect to the functionality regarding the reception signal, the method may be implemented, for example, in a transceiver 14, 34, in a communication control device 21, and the like. In addition or as an alternative, it may be integrated into existing products, as is illustrated with user station 10.

What is claimed is:

1. A subscriber station for a bus system in a vehicle, comprising:
   a pulse shaping device to shape a pulse of a message so that the message includes a training sequence which includes pieces of information for determining the channel characteristic between the subscriber station and a further subscriber station of the bus system to which further subscriber station the message is to be transmitted; and
   a correction device to correct a signal received by the subscriber station based on a training sequence, which is included in a message shaped by a pulse shaping device of the further subscriber station;
   wherein the pulse shaping device is configured so that it shapes the message so that the training sequence is arranged in a data segment that is transmitted at a higher data rate than provided for according to the CAN protocol and that is arranged after a frame header and before a frame end of the message,
   wherein the frame header is formed according to the CAN protocol and an arbitration is performed in a form from CAN,
   wherein the frame end is formed according to a CAN protocol,
   wherein the correction device performs a channel estimation based on the received training sequence, and
   wherein the correction device uses the channel estimation to equalize or correct the signal received by the subscriber station.

2. The subscriber station of claim 1, wherein in the data segment the messages are coupled into the bus system in the form of signals having a high data rate with constant impedance of the transmission output stage.

3. The subscriber station of claim 1, wherein at least one of the following is satisfied:
   the pulse shaping device is configured so that it situates the training sequence at the start or in the middle of a data segment which is situated between the frame header and the frame end of the message; and
   the pulse shaping device is configured so that it forms the data in the data segment using a bit rate in the range of 5 to 100 Mbit/s.

4. The subscriber station of claim 3, wherein the pulse shaping device is configured so that the data segment includes parameters, information bits and a checksum, in this order, and wherein the information bits include pieces of information which are to be transmitted from the subscriber station as the transmitter to the further subscriber station as the receiver.

5. The subscriber station of claim 1, wherein the correction device is further configured to correct the signal received by the subscriber station according to one of a decision feedback equalization (DFE) algorithm, an arbitrary trellis-based equalization (BCJR: Bahl, Cocke, Jelinek, Raviv) algorithm, and a delayed decision-feedback sequence estimation (DDFSE) algorithm for signal equalization.

6. The subscriber station of claim 1, wherein the correction device includes an analog-to-digital converter which is combined with a CAN transceiver, and the pulse shaping device includes a digital-to-analog converter including a downstream switch for coupling recessive states onto the bus line, and/or the pulse shaping device includes a pull-down transistor or a transceiver for coupling dominant states onto the bus line.

7. The subscriber station of claim 1, further comprising:
   a transceiver for providing a direct connection to a bus line of the bus system; and
   a communication control device to process the signals received by the transceiver and to provide the messages to be transmitted by it in the form of signals;
   wherein at least one of the pulse shaping device and the correction device is part of the transceiver or of the communication control device.

8. A subscriber system for a vehicle, comprising:
   a bus line; and
   at least two subscriber stations, which are connected to each other via the bus line so that they are able to communicate with each other;
   wherein at least one of the at least two subscriber stations includes a subscriber station that includes:
     a pulse shaping device to shape a pulse of a message so that the message includes a training sequence which includes pieces of information for determining the channel characteristic between the subscriber station and a further subscriber station of the bus system to which the message is to be transmitted; and
     a correction device to correct a signal received by the subscriber station based on a training sequence, which is included in a message shaped by a pulse shaping device of the further subscriber station;
     wherein the pulse shaping device is configured so that it shapes the message so that the training sequence is arranged in a data segment that is transmitted at a higher data rate than provided for according to the CAN protocol and that is arranged after a frame header and before a frame end of the message,
     wherein the frame header is formed according to the CAN protocol and an arbitration is performed in a form from CAN,
     wherein the frame end is formed according to a CAN protocol,
     wherein the correction device performs a channel estimation based on the received training sequence, and wherein the correction device uses the channel estimation to equalize or correct the signal received by the subscriber station.

9. A method for providing broadband CAN communication in a vehicle, the method comprising:
shaping a pulse, with a pulse shaping device, of a message so that the message includes a training sequence which includes pieces of information for determining the channel characteristic between a subscriber station and a further subscriber station of the bus system to which the message is to be transmitted;
wherein the training sequence is arranged in a data segment that is transmitted at a higher data rate than provided for according to the CAN protocol and that is arranged after a frame header and before a frame end of the message,
wherein the frame header is formed according to the CAN protocol and an arbitration is performed in a form from CAN,
wherein the frame end is formed according to the CAN protocol,
channel estimation, using a correction device, based on the received training sequence,
correction, using a correction device, of a signal received by the subscriber station based on the received training sequence that is included in the message formed by the pulse shaping device, and
wherein the correction device uses the channel estimation to equalize or correct the signal received by the subscriber station.

* * * * *